United States Patent [19]
Dailey et al.

[11] Patent Number: 5,207,760
[45] Date of Patent: May 4, 1993

[54] MULTI-MEGAWATT PULSED INDUCTIVE THRUSTER

[75] Inventors: Charles L. Dailey, Palos Verdes Estates, Calif.; Ralph H. Lovberg, Santa Fe, N. Mex.; James L. Hieatt, Manhattan Beach, Calif.

[73] Assignee: TRW Inc., Redondo Beach, Calif.

[21] Appl. No.: 734,723

[22] Filed: Jul. 23, 1991

[51] Int. Cl.$^5$ .............................................. F03H 5/00
[52] U.S. Cl. ......................................... 60/202; 60/204; 315/111.81
[58] Field of Search ................... 60/202, 203.1, 204; 250/423 R; 315/111.41, 111.81; 313/359.1, 361.1

[56] References Cited

U.S. PATENT DOCUMENTS

| | | | |
|---|---|---|---|
| 3,290,541 | 12/1966 | Hertz | 60/202 |
| 4,209,703 | 6/1980 | Delcroix et al. | 60/202 |
| 4,712,042 | 12/1987 | Hamm | 313/359.1 |
| 4,849,675 | 7/1989 | Muller | 315/111.81 |
| 4,891,600 | 1/1990 | Cox | 60/202 |

Primary Examiner—Richard A. Bertsch
Assistant Examiner—Michael I. Kocharov
Attorney, Agent, or Firm—G. Gregory Schivley; Sol L. Goldstein

[57] ABSTRACT

This invention discloses an engine for use in sustained space travel. The engine is of an electric type powered by a nuclear reactor. The electric engine includes a pulsed inductive magnetic thruster. A gas is discharged against an inductor comprising a series of parallel coils arranged in a spiral fashion. Each coil consists of four separate electrically connected coil sections. Each coil section traverses one-quarter of the distance around the inductor from an outer perimeter to an inner perimeter to form a single closed loop. A capacitor is electrically connected to two outer perimeter connector points for each coil forming a Marx Bank arrangement. All capacitors are charged to full charge and discharged simultaneously by a trigger generator immediately after a puff of propellant gas reaches the inductor. The high induced EMF in the inductor caused by the multiple capacitors in series in a single loop creates a rapidly rising magnetic field which ionizes the propellant gas. The current and magnetic field in the ionized gas drives the gas away from the coil creating the thrust which drives the spaceship.

25 Claims, 6 Drawing Sheets

MULTI-MEGAWATT PULSED INDUCTIVE THRUSTER

BACKGROUND OF THE INVENTION

1. Field of the Invention

This invention relates generally to an inductive type magnetic thruster, and more specifically, to a pulsed inductive type magnetic thruster incorporating a plurality of parallel-connected one-turn coils for use as an engine in a space vehicle.

2. Discussion

Rocket engines for long term space exploration must meet demanding requirements that may not be as crucial in their present short term counterparts. Currently, experimentation is being conducted into developing engines that will meet the necessary requirements for long duration missions. Considerations include that the components of the engine be extremely durable and reliable. Also, high rocket exhaust velocity is necessary to reduce fuel requirement in order to achieve high useful payloads. These requirements provide a challenging avenue for engineers developing such engines.

Different types of designs have been experimented with over the course of the development of this technology. Generally, chemical propulsion engines are required to provide the initial launch function of a rocket because of their high thrust-to-mass ratios. However, chemical rockets typically exhibit a low propellant exhaust velocity, usually referred to as specific impulse ($I_{sp}$) Therefore, other types of engines that do not require the generation of heat for propellant acceleration have been experimented with to provide the high $I_{sp}$ necessary for sustained long term space travel. Specifically, certain electric type engines are known which use either electric fields (Ion Engine) or magnetic fields (direct-current, electrode type engines) for propulsion. However, these types of engines have typically met with various drawbacks limiting their success.

One specific problem has been electrode erosion that becomes an important factor when extended use is required. The need for electrodes can be avoided by the use of inductive type magnetic thrusters which are known to the electric propulsion art. One particular design incorporates a single-turn, flat, spiral induction coil. In that design, multiple parallel connected, single-turn coil sections, that spiral inward from the outside diameter of the annular coil to the inner diameter, are placed on one side of the inductor, with radial current return sections located on the other side of the inductor to form a complete coil. A large number of coils are connected in parallel for low coil parasitic inductance. Capacitors, with spark-gap switches, are inserted at some point in the loop to drive short pulses of electric current, using techniques known to those skilled in the art. A master trigger generator is used to synchronize firing of all of the capacitors. A desirable propellant gas is injected against the coil, which when energized by the capacitor discharge becomes electrically conducting. The magnetic force acting on the electrically conducting propellant generates the rocket engine thrust.

This prior art inductive design still suffers from a number of drawbacks preventing it from being an effective means for long term space travel. What is lacking in this design, and thus is needed, is an inductive type magnetic thruster which utilizes a long life propellant injection valve having better propellant placement for closer inductive coil coupling with the plasma propellant; an electric thruster circuit capable of producing a large initial electric field for efficient ionization; a low parasitic inductance; and the use of solid state switches for improved thruster efficiency and long life mission capability. Of particular importance for the practical implementation of such an improved thruster in a spacecraft electric propulsion system is a coil concept that permits the voltage requirements of the thruster to be met with existing generator technology without requiring the additional mass inherent in the thruster power conditioner. It is an object of this invention to provide for a pulsed inductive thruster which meets the thruster's requirements for effective ionization and efficient thrust generation without requiring special power conditioning for voltage transformation, voltage regulation or filtering.

SUMMARY OF THE INVENTION

Disclosed is a multi-megawatt pulsed inductive thruster (PIT) which comprises a flat spiral coil inductor consisting of a plurality of parallel-connected coils. Current from an array of energy discharge capacitors is introduced into each coil to generate a rapidly increasing magnetic field that will ionize a propellant gas placed in close proximity to the inductor. A fractional turn coil design is used for the inductor in which the coil sections extend from outer to inner radii of the annular spiral in less than one turn. Capacitors discharging into the fractional turn sections act as an inductive Marx Bank producing a one-turn coil EMF equal to the capacitor voltage multiplied by the number of capacitors connected to the coil sections in the loop.

In one embodiment, each parallel coil of the inductor includes four separate coil sections, with two capacitors. A first coil section is connected to a first connecting point on an outer radius of the inductor and travels one-quarter of the way around the inductor to be connected at a first connecting point on an inner radius of the inductor. A second coil section (on the opposite side of the inductor from the first coil section) is connected to the first inner radius connecting point, returns to the outer radius after another one-quarter turn and connects to a second outer radius connecting point. A third coil section is attached to the second outer connecting point, on the same inductor face as the first coil section, and is taken through another one-quarter turn to a second inner radius connecting point where it is attached. A fourth coil section (on the same side of the inductor as the second coil section) completes the last quarter turn of the one-turn loop of the inductor by attaching at the second inner and first outer connecting points. Capacitor/switch combinations are connected at each of the two outer radius connecting point, with the low voltage side of each capacitor connected to the coil section coming from the inside radius and the high voltage side connected to the section that goes to the next inside radius. Upon discharge, the voltage of each capacitor is applied across two coil sections producing an EMF equal to the capacitor voltage. Because two capacitors are used for the one-turn coil, the total EMF for the inductor is twice as great as the capacitor voltage. Thus, a factor of two gain in coil EMF over the power source voltage has been achieved without use of a transformer. In an alternate embodiment, capacitor switch combinations are connected at the inner radius connecting points in addition to those at the two outer connecting points, thereby producing a coil EMF four times as great as the capacitor voltage, again without use of a transformer.

In operation of the PIT, a pulse of gas is injected towards one face of the inductor after the capacitors have become fully charged. When the gas pulse has reached its closest position to the inductor face, the capacitors are simultaneously discharged. The large EMF of the Marx Bank enables a fast rising magnetic field that induces an azimuthal electric field in the propellant gas that is large enough to completely ionize the gas very early in the discharge. The magnetic field produced in the ionized gas (plasma) by the electric currents in the inductor and in the plasma generates a local thrust force density at any point that is equal to the product of the local plasma current with the local magnetic field at that point. The thrust force is the integrated total of all the local force densities over the entire plasma volume. The capacitors are recharged after each discharge and fired again at a steady pulse rate that produces the required continuous average thrust force.

Additional objects, advantages, and features of the present invention will become apparent from the following description and appended claims, taken in conjunction with the accompanying drawings.

DETAILED DESCRIPTION OF THE PREFERRED EMBODIMENTS

The following description of the preferred embodiments is merely exemplary in nature and is in no way intended to limit the invention or its application or uses.

Figure 1:
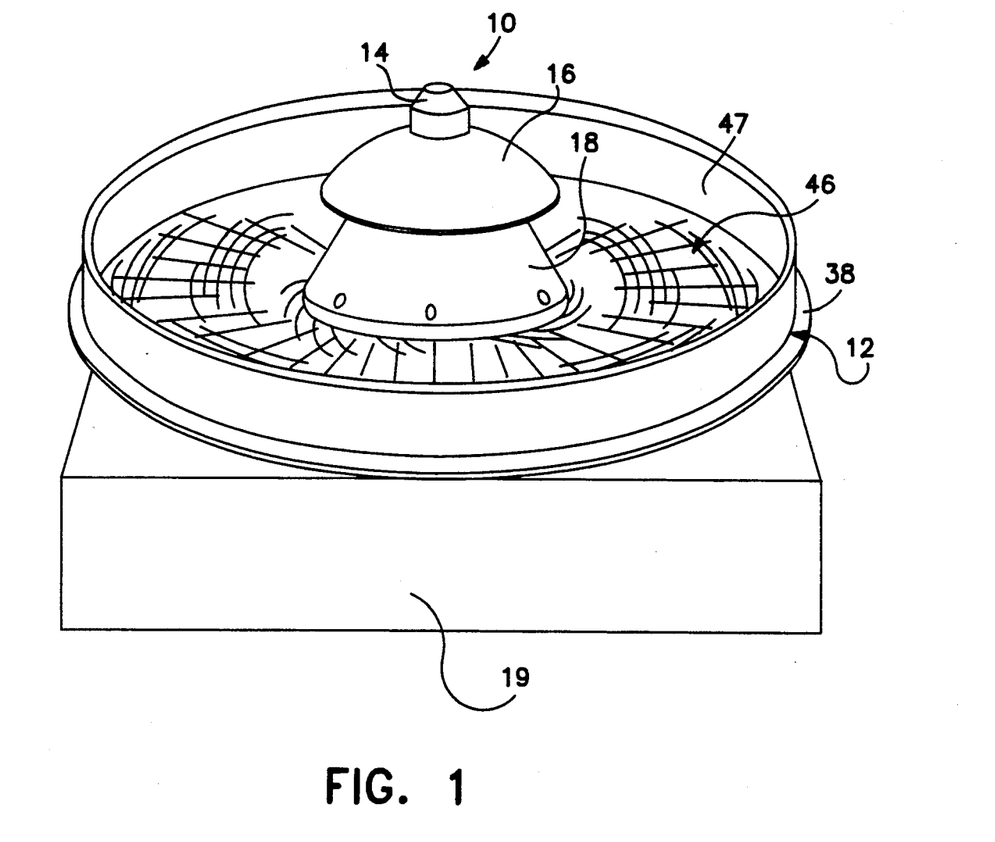
FIG. 1 is a perspective view of a pulsed inductive thruster (PIT) according to one embodiment of the present invention.
Figure 2:
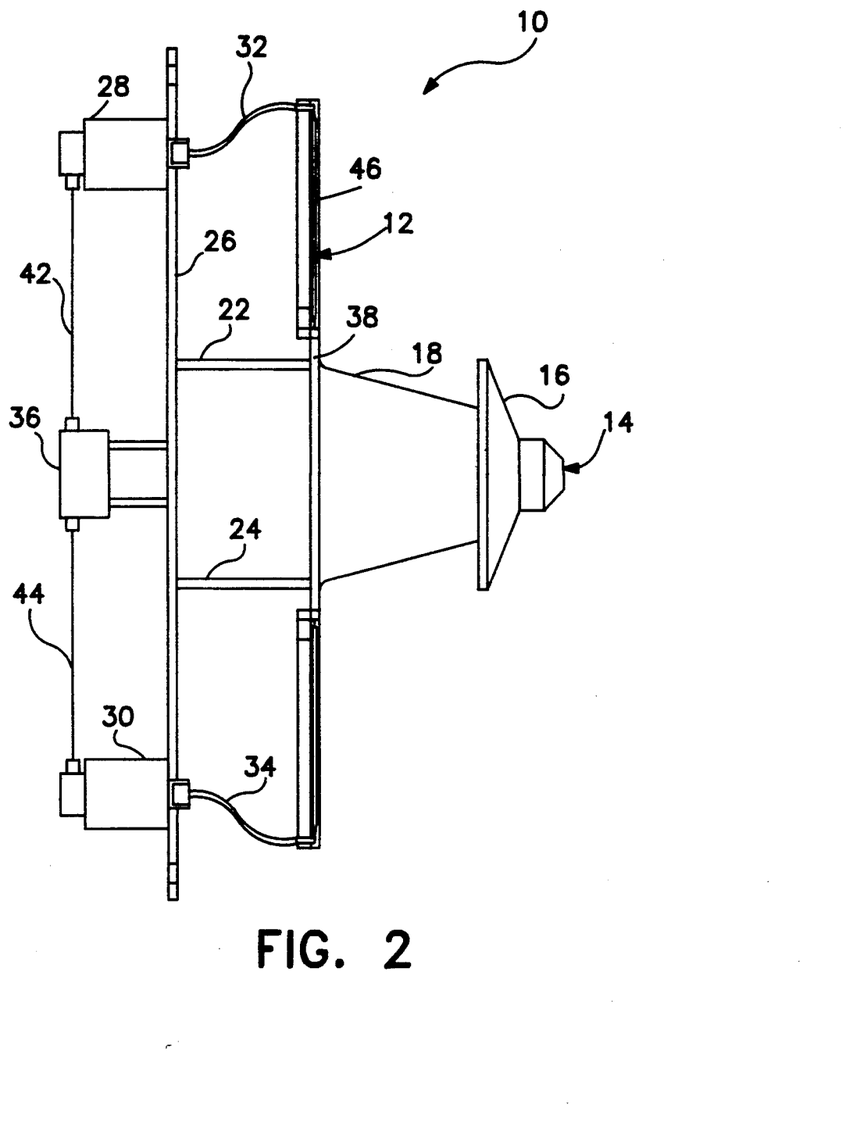
FIG. 2 is a side view of the PIT of FIG. 1.

First turning to FIGS. 1 and 2, a basic understanding of the configuration of a PIT 10, according to one embodiment of the present invention, can be ascertained. FIG. 1 is a perspective view of PIT 10 and FIG. 2 is a side view of PIT 10. PIT 10 includes a flat, annular inductor 12. Inductor 12 comprises a series of parallel individual coils 46 appropriately configured, as will be described hereunder, on a circular substrate 38. Positioned adjacent an outside face of inductor 12 is a gas discharge valve 14. Gas discharge valve 14 is connected to substrate 38 by a conical support 18 proximate the center of substrate 38, as shown. Further, gas discharge valve 14 includes a conical hood 16 for dispersing the gas. As will be described hereunder, a gas, such as argon, is introduced in pulses from a tank (not shown) through valve 14 such that conical hood 16 disperses the gas around the outside of conical support 18 and against the outside face of inductor 12. A cuff 47 prevents loss of gas over the outside rim of inductor 12. FIG. 1 indicates the remaining components of PIT 10 schematically by housing 19 at the back side of inductor 12. As seen in FIG. 2, however, PIT 10 does not incorporate an enclosure such as housing 19. Opposite gas discharge valve 14 and proximate an inside face of inductor 12 is a support plate 26. Support plate 26 is displaced from inductor 12 to prevent magnetic interference with inductor 12. Support plate 26 is connected to substrate 38 by means of support members 22 and 24, also proximate the center of substrate 38 as shown. Support plate 26 is incorporated to support and position a plurality of capacitors. In FIG. 2, only capacitors 28 and 30 are shown, but in practice many more will be included as will be described below. Each of capacitors 28 and 30 is electrically connected to a capacitor charger power source (not shown), a trigger generator 36 and a number of specific coils 46 of inductor 12. In FIG. 2, capacitors 28 and 30 are connected to coils 46 by mean of wires 32 and 34 and to trigger generator 36 by coaxial wires 42 and 44, respectively. Trigger generator 36 is also supported by support plate 26 as shown. Typically, the electrical power required to charge capacitors 28 and 30 is generated by a nuclear-electric power source.

Figure 3:
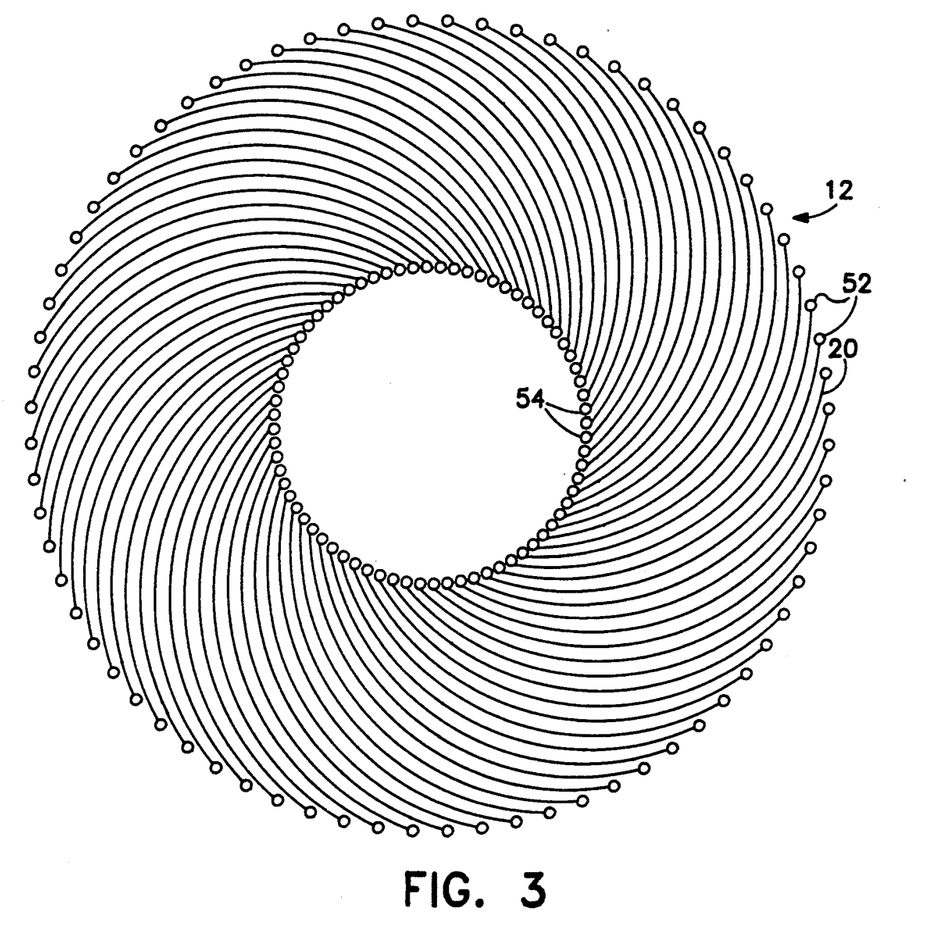
FIG. 3 is a front view of the parallel connected coil sections of the PIT of FIG. 1.

FIG. 3 shows the front (or back) side of inductor 12 incorporating 72 coil sections 20 on each side. Specifically, inductor 12 is configured such that each separate coil section 20 is electrically connected to a connector point 52 at an outer perimeter of annular inductor 12 and electrically connected to a connector point 54 along an inner perimeter of annular inductor 12, as shown. By tracing out a starting point from an outer connector point 52 to an inner connector point 54 along any separate coil section 20, it is apparent that each coil section 20 traverses one-quarter of the total distance around the entire annular inductor 12. Coil sections 20 are arranged on both faces of substrate 38 in this manner. Therefore, the configuration of FIG. 3 could be either face of substrate 38.

Figure 4:
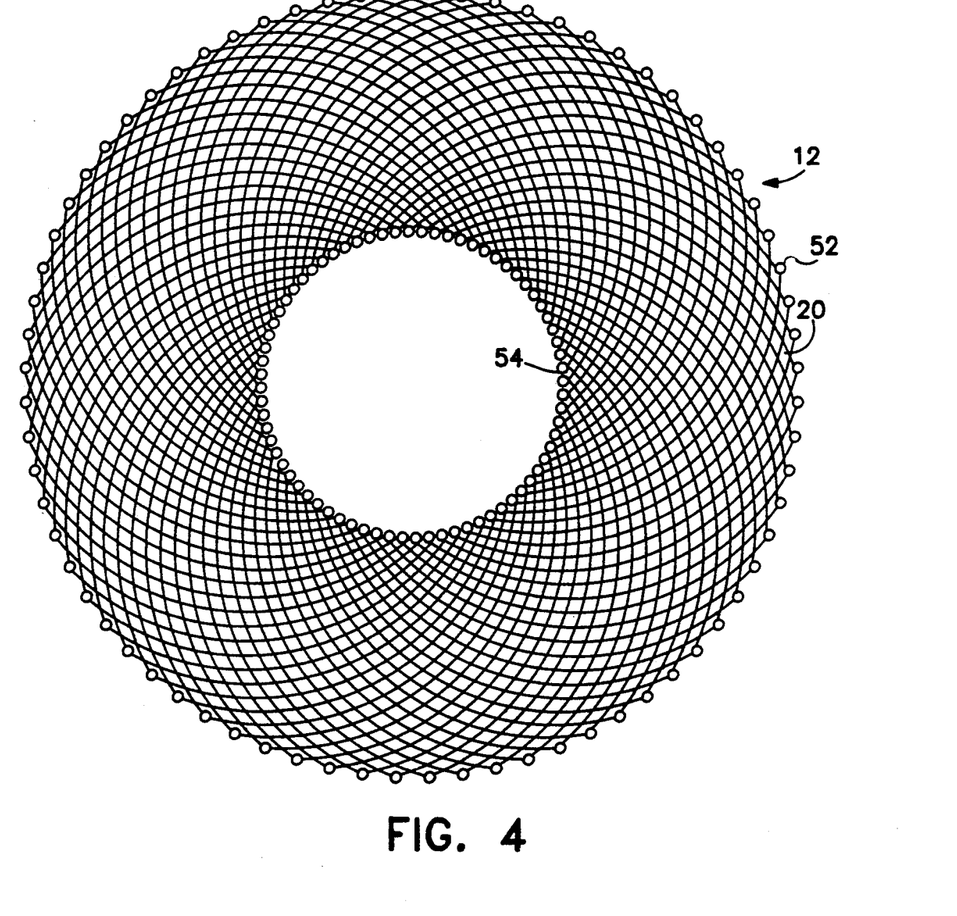
FIG. 4 is a view of the parallel connected coil sections of the PIT of FIG. 1 (front and rear views are identical)
Figure 6:
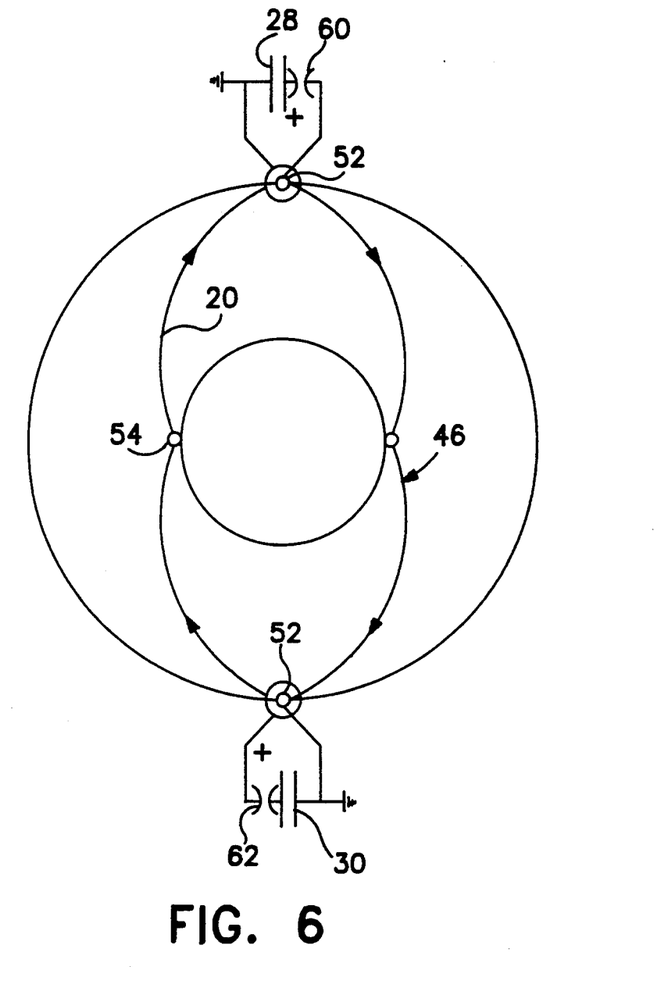
FIG. 6 is a single coil and capacitor configuration schematic according to one embodiment of the present invention. The actual inductor has several coil sections parallel-connected in the two-capacitor loop.

Now turning to FIG. 4, the configuration of every coil section 20 of inductor 12 is shown as if substrate 38 were transparent. In other words, there are twice as many coil sections 20 as are shown in FIG. 3, one-half being on one face of substrate 38 and the other half being on the opposite face of substrate 38. By studying FIGS. 3 and 4, and following the description as given above, it will become apparent that four coil sections 20 will make up a complete revolution of each coil 46 around inductor 12. Beginning at any outer connector point 52 a first coil section 20 will travel along one face of substrate 38 and be electrically connected to a first inner connector point 54 completing one-quarter of the revolution around inductor 12. From the first inner connector point 54 a second coil section 20 will travel another one-quarter distance around inductor 12 on the opposite face of substrate 38 and be electrically connected to a second outer connector point 52. Two interconnected coil sections 20 will then have traveled half the distance around inductor 12 in a W-shape. A third coil section 20 will be electrically connected to the second outer connector point 52 and travel another one-quarter of the distance around inductor 12 on the same side of substrate 38 as the first coil section 20 and be electrically connected to a second inner connector point 54. A fourth coil section 20 will be electrically connected to the second inner connector point 54 and travel the remaining distance around inductor 12 on the same side of substrate 30 as the second coil section 20 and be electrically connected to the first outer connector point 52 to form a complete loop of coil 46. A single loop in this arrangement is shown in FIG. 6. In the one embodiment disclosed, there are 36 such coil loops, or 144 coil sections 20 as shown in FIG. 4. Of course, other arrangements of coils, including more or less coil sections or loops, can be used without departing from the scope of the present invention.

Figure 5:
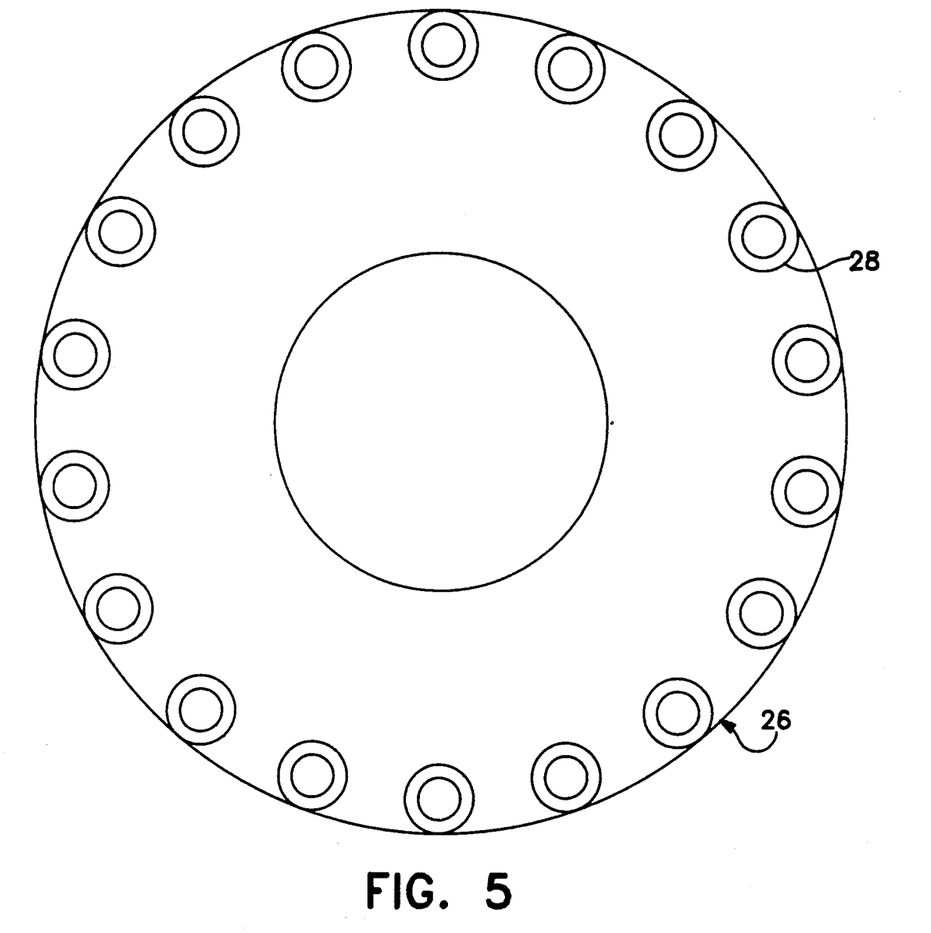
FIG. 5 is a series of parallel connected capacitors for energizing the inductor of the PIT of FIG. 1.

Now turning to FIG. 5, support plate 26 supporting the capacitors is shown. As discussed above for FIG. 2, only capacitors 28 and 30 were shown. In practice, however, several more of these capacitors will be incorporated. In one embodiment of the present invention, every four consecutive outer connector points 52 are electrically connected in parallel to a single capacitor. Therefore, for capacitor 28, electrical line 32 will connect to a set of four consecutive outer connector points 52 as will capacitor 30. Consequently, support plate 26 supports 18 capacitors in the embodiment shown in FIG. 5. As is apparent from this description, each separate coil 46, as shown in FIG. 6, includes two capacitors connected to it. A single inductive loop which is electrically connected to more than one capacitor is commonly referred to as an inductive Marx Bank. As will be understood, other arrangements of the capacitors can be incorporated without departing from the scope of the present invention.

Now turning to FIG. 6, a single coil 46 of inductor 12 comprising four separate coil sections 20 as discussed above is shown. At each of the outer connector points 52, the coil sections 20 are connected to capacitors 28 and 30, as shown. It is noted that three other consecutive connector points 52 are electrically connected in parallel to capacitor 28 in substantially the same configuration as shown, as well as for capacitor 30. A switch 60 enables capacitor 28 to be discharged into coil 20 through a connector point 52. Likewise, a switch 62 enables capacitor 30 to be discharged simultaneously into coils 20 through a connector 52. Trigger generator 36 would close switches 60 and 62, as well as all of the other switches associated with the other capacitors, at the same time. The desirability of this Marx Bank configuration in accordance with at least one point of novelty of the present invention will be understood from the description of the operation given below.

By including a series of four coil sections in one loop, with two capacitors in the loop, the voltage of the coil/switch assembly is reduced by a factor of two while still maintaining the high induced EMF of the coil loop that is required for high ionization effectiveness and high thruster efficiency. This voltage reduction capability of the Marx Bank configuration of the PIT makes it possible to match the high EMF thruster to state of the art alternators without requiring a voltage transformer. The consequent mass saving is particularly important for high power spacecraft applications. The transformer mass eliminated by this invention is directly reflected in increased payload capability. An associated advantage of both the large number of parallel coils and the several capacitors used in each coil is the ease with which solid state switches can be incorporated in the low parasitic inductance thruster design. A state of the art feature of the coil geometry, seen in FIGS. 3 and 4, is the decreased coil section spacing toward the outer radius. This is done to compensate for loss of magnetic field due to the fringing effect of the annular inductor.

In operation of PIT 10, each capacitor is simultaneously charged by a voltage source to its charging level. After the capacitors are charged, a pulse of gas is injected by discharge valve 14. The gas is discharged out of conical hood 16 towards inductor 12. When the cloud of gas from conical hood 16 impacts inductor 12 it spreads out across the entire face of inductor 12 forming a sheet of gas. Once the gas hits inductor 12, it also begins to propagate backwards away for inductor 12. After the cloud of gas reaches inductor 12, but before it has a chance to be substantially reflected back, trigger generator 36 discharges all of the capacitors simultaneously. As discussed above, four coil sections 20 combine to form a single loop coil 46. At the outer connector points of each coil 46, a capacitor is connected to the coil 46. Therefore, each coil 46 has two capacitors connected to it. Since each capacitor is discharged at the same time, the EMF induced by the single coil 46 is double the voltage of each capacitor separately.

Upon switch closure of trigger generator 36, the total voltage from capacitors 28 and 30 is applied to each coil 46 causing the current to rise in the coil at a rate di/dt (where di is the change in coil current and dt is the change in time) which is equal to V/L, where V is the sum of the capacitor voltages and L is the thruster circuit inductance. At the instant of switch closure the voltage is large, but so also is the initial inductance of the coil whose magnetic field expands radially and axially away from the coil in the toroidal configuration typical of such a coil when no other current is present. The consequent limiting effect of this large initial inductance on di/dt is serious for the PIT. For it is the azimuthal electric field induced in the gas in front of the inductor by the rapidly varying magnetic field, dB/dt (where dB is the change in magnetic field), due to the coil di/dt that must ionize the gas, and this must happen very early in the capacitor discharge period to achieve high thruster efficiency. The EMF multiplication of the inductive Marx Bank makes it possible to achieve the necessarily large initial di/dt without seriously affecting the voltage requirement of the alternator which powers the thruster. As soon as the gas has become ionized and electrically conductive (a plasma), an intense current sheet forms that confines the magnetic field due to both the coil current and the plasma current to the space between these two current sheets. At this time, when the plasma current sheet is closest to the inductor face, the L which determines di/dt is the parasitic circuit inductance, which is carefully designed to be as small as possible in the present invention so as to maximize dB/dt. The plasma current multiplied by its local magnetic field is the well known force equal to the product of current and magnetic field. This force can also be represented as proportional to the square of the local magnetic field, $B^2$. Consequently, it is proportional to the inverse of the square of the parasitic inductance. Also, it is a well known theorem of the PIT that thruster efficiency for fully ionized propellant is directly related to the ratio of maximum thruster inductance (as plasma leaves the thruster) to the initial inductance (parasitic) when the plasma is closest to the inductor. Thus, it is clearly seen that use of the inductive Marx Bank for early ionization, the design for minimum parasitic inductance for high thruster efficiency, and the reduction of the voltage requirement on the alternator are important features of the invention. The associated ease of solid state switching is also an attractive advantage.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A method of providing thrust by means of an inductive type magnetic thruster comprising the steps of:
connecting a series of electrically parallel coils in a flat, spiral inductor arrangement, wherein each coil includes at least two coil sections such that each coil section is electrically connected to an outer perimeter of the inductor and an inner perimeter of the inductor;
connecting a series of discharge capacitors in electrical connection with the inductor such that each coil is electrically connected to at least two capacitors;
injecting an ionizable gas towards the inductor such that the gas substantially uniformly spreads out over a face of the conductor; and
simultaneously discharging all of the capacitors of the series of capacitors to create a magnetic field which ionizes the gas and forces the gas away from the inductor providing thrust.

2. The method according to claim 1 wherein the step of connecting a series of coil sections includes the steps of connecting a first coil section in electrical contact with a first outer connective point at the outer perimeter of the inductor such that the first coil section travels one-quarter of the distance around the inductor and electrically connects to a first inner connective point on the inner perimeter of the inductor, connecting a second coil section in electrical contact with the first inner connective point such that the second coil section travels one-quarter of the distance around the inductor to be electrically connected to a second outer connective point opposite to the first outer connective point on the outer perimeter of the inductor, connecting a third coil section in electrical contact with the second outer connective point on the outer perimeter such that the third coil section travels one-quarter of the distance around the inductor to be electrically connected to a second inner connective point opposite to the first inner connective point on the inner perimeter of the inductor, and connecting a fourth coil section in electrical contact with the second inner connective point on the inner perimeter such that the fourth coil section travels one-quarter of the distance around the inductor to be connected to the first connective point on the outer perimeter to form a closed coil loop.

3. The method according to claim 1 wherein the step of connecting a series of capacitors includes electrically connecting a capacitor to the first outer connective point and electrically connecting a capacitor to the second outer connective point of each coil.

4. The method according to claim 1 wherein the steps of connecting the first coil section and the third coil section includes positioning the first coil section and the third coil section on one face of the inductor and the steps of connecting the second coil section and a fourth coil section include positioning the second coil section and the fourth coil section on an opposite face of the inductor.

5. The method according to claim 1 wherein the step of connecting a series of capacitors includes electrically connecting each capacitor to four consecutive outer connective points.

6. The method according to claim 1 wherein the step of discharging the capacitors includes discharging the capacitors through a solid state switch.

7. The method according to claim 1 wherein the step of injecting the gas includes injecting the gas at a pulsed rate such that each pulse is injected and ionized and thrusted away from the coil prior to the next pulse of gas being injected and wherein the capacitors are simultaneously charged before the next pulse of gas arrives at the inductor.

8. An inductive type magnetic thruster comprising:
a series of electrically parallel coils forming an inductor arranged in a spiral pattern, each coil of said series of coils including at least two coil sections, each coil section being electrically connected at an outer perimeter of the inductor and an inner perimeter of the inductor;
a series of discharge capacitors wherein at least two of the capacitors are electrically connected to each coil; and
gas injection means for injecting a gas towards the inductor, wherein discharge of the capacitors creates a rising magnetic field which causes ionization of the gas providing the thrust.

9. The thruster according to claim 8 wherein each coil of the series of coils comprises four coil sections, a first coil section being electrically connected to a first outer connective point at the outer perimeter of the inductor and traveling one-quarter of the distance around the inductor to a first inner connective point on the inner perimeter of the inductor, a second coil section being electrically connected to the first inner connective point and traveling one-quarter of the distance around the inductor to a second outer connective point opposite the first outer connective point on the outer perimeter of the inductor, a third coil section being electrically connected to the second outer connective point on the outer perimeter and traveling one-quarter of the distance around the inductor to a second inner connective point opposite the first inner connective point on the inner perimeter of the inductor, and a fourth coil section being electrically connected to the second inner connective point on the inner perimeter and traveling one-quarter of the distance around the inductor to the first connective point on the outer perimeter forming a closed coil loop.

10. The thruster according to claim 9 wherein a capacitor is electrically connected to the first outer connective point and a capacitor is electrically connected to the second outer connective point of each coil.

11. The thruster according to claim 8 further comprising a triggering means for discharging all of the capacitors simultaneously.

12. The thruster according to claim 9 wherein the first coil section and the third coil section are positioned on one face of the inductor and the second coil section and the fourth coil section are positioned on an opposite face of the inductor.

13. The thruster according to claim 8 wherein the gas injection means is a conical nozzle positioned substantially in line with the center of the inductor such that gas introduced by the nozzle spreads out uniformly across a front face of the inductor forming a gas sheet.

14. The thruster according to claim 10 wherein the inductor includes 36 separate, parallel coils.

15. The thruster according to claim 14 wherein the series of capacitors is 18 capacitors such that each capacitor is electrically connected to four consecutive outer connective points.

16. The thruster according to claim 8 wherein the gas injection means injects the gas at a pulsed rate.

17. The thruster according to claim 8 wherein each capacitor is discharged into a coil through a switch wherein the switch is a solid state switch.

18. An inductive type magnetic thruster comprising:
a series of parallel-connected coils forming an inductor arranged in a spiral pattern, each coil of said series of coils including four coil sections, a first coil section being electrically connected to a first outer connective point at an outer perimeter of the conductor and traveling one-quarter of the distance around the inductor to a first inner connective point on an inner perimeter of the inductor, a second coil section being electrically connected to the first inner connective point and traveling one-quarter of the distance around the inductor to a second outer connective point opposite the first outer connective point on the outer perimeter of the conductor, a third coil section being electrically connected to the second outer connective point on the outer perimeter and traveling one-quarter of the distance around the inductor to a second inner connective point opposite the first inner connective point on the inner perimeter of the inductor, and a fourth coil section being electrically connected to the second inner connective point on the inner perimeter and traveling one-quarter of the distance around the inductor to the first connective point on the outer perimeter forming a closed coil loop;
a series of discharge capacitors electrically connected to the inductor, wherein at least two of the capacitors are connected to each coil loop; and
gas injection means for injecting a gas towards the inductor, wherein discharge of the capacitors creates a magnetic field which ionizes the gas and provides the thrust.

19. The thruster according to claim 18 wherein a capacitor of the series of capacitors is electrically connected to the first outer connective point and a capacitor of the series of capacitors is electrically connected to the second outer connective point of each coil.

20. The thruster according to claim 18 wherein each capacitor of the series of capacitors is electrically connected to four consecutive outer connective points of four coils.

21. The thruster according to claim 18 wherein the inductor includes 36 separate coils.

22. The thruster according to claim 18 wherein the first coil section and the third coil section of each coil are positioned on one face of the inductor and the second coil section and the fourth coil section of each coil are positioned on an opposite face of the inductor.

23. The thruster according to claim 18 further comprising a triggering means for discharging all of the capacitors simultaneously.

24. The thruster according to claim 18 wherein the gas injection means injects the gas at a pulsed rate.

25. The thruster according to claim 18 wherein each capacitor is discharged into a coil through a switch wherein said switch is a solid state switch.

* * * * *